US012578137B2

(12) United States Patent
Kim et al.

(10) Patent No.: US 12,578,137 B2
(45) Date of Patent: Mar. 17, 2026

(54) REFRIGERATOR WITH FILTER HAVING PHOTOCATALYST

(71) Applicant: LG Electronics Inc., Seoul (KR)

(72) Inventors: Seungyong Kim, Seoul (KR); Seongkyo Seo, Seoul (KR); Sangho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 18/285,328

(22) PCT Filed: Mar. 25, 2022

(86) PCT No.: PCT/KR2022/004223
§ 371 (c)(1),
(2) Date: Oct. 2, 2023

(87) PCT Pub. No.: WO2022/211386
PCT Pub. Date: Oct. 6, 2022

(65) Prior Publication Data
US 2024/0183601 A1      Jun. 6, 2024

(30) Foreign Application Priority Data
Apr. 2, 2021    (KR) ........................ 10-2021-0043241

(51) Int. Cl.
*F25D 17/06*      (2006.01)
*B01D 46/00*      (2022.01)

(52) U.S. Cl.
CPC ....... *F25D 17/067* (2013.01); *B01D 46/0028* (2013.01); *B01D 2255/802* (2013.01); *F25D 2317/063* (2013.01)

(58) Field of Classification Search
CPC ...... A61L 2/084; A61L 2/088; A61L 2209/14; A61L 9/16; B01D 2255/802;
(Continued)

(56) References Cited

U.S. PATENT DOCUMENTS

2018/0272024 A1*   9/2018   Seo .......................... A61L 9/205
2019/0083674 A1*   3/2019   Jeong ...................... A61L 9/205
(Continued)

FOREIGN PATENT DOCUMENTS

EP          2141427   A1      1/2010
JP       2009-030916           2/2009
(Continued)

OTHER PUBLICATIONS

Extended European Search Report in European Appln. No. 22781505.7, mailed on Jan. 28, 2025, 8 pages.

*Primary Examiner* — Henry T Crenshaw
(74) *Attorney, Agent, or Firm* — Fish & Richardson P.C.

(57) ABSTRACT

According to an embodiment of the present invention, a refrigerator comprises: a cabinet; a grill pan assembly having a channel guiding a flow for supplying cool air to a storage space, and an outlet for discharging the cool air; and a filter device mounted on the grill pan assembly, wherein the filter device comprises a front part, a frame part for accommodating a filter member, and an LED module for emitting light at the filter member, and the filter member comprises a photocatalyst for removing pollutants or bacteria adsorbed on the filter member in response to the visible light emitted from the LED module.

16 Claims, 8 Drawing Sheets

(58) Field of Classification Search
CPC . B01D 46/0028; F25D 17/042; F25D 17/067;
F25D 2317/0415; F25D 2317/063; F25D
2317/067
See application file for complete search history.

(56) References Cited

U.S. PATENT DOCUMENTS

| | | | |
|---|---|---|---|
| 2020/0072528 A1* | 3/2020 | Buzzi | F25D 17/065 |
| 2021/0030915 A1 | 2/2021 | Kim et al. | |

FOREIGN PATENT DOCUMENTS

| | | | |
|---|---|---|---|
| JP | 2011-033296 A1 | | 2/2011 |
| JP | 2011033296 | * | 2/2011 |
| JP | 6157858 B2 | | 7/2017 |
| KR | 10-2013-0015016 | | 2/2013 |
| KR | 10-2014-0101629 | | 8/2014 |
| KR | 10-2015-0014815 | | 2/2015 |
| KR | 10-2017-0022619 | | 3/2017 |

* cited by examiner

REFRIGERATOR WITH FILTER HAVING PHOTOCATALYST

CROSS-REFERENCE TO RELATED APPLICATIONS

This application is a National Stage application under 35 U.S.C. § 371 of International Application No. PCT/KR2022/004223, filed on Mar. 25, 2022, which claims the benefit of Korean Patent Application No. 10-2021-0043241, filed on Apr. 2, 2021. The disclosures of the prior applications are incorporated by reference in their entirety.

TECHNICAL FIELD

The present invention relates to a refrigerator.

BACKGROUND ART

In general, a refrigerator is a home appliance for storing food at a low temperature in a storage space that is covered by a refrigerator door.

The refrigerator is configured to keep stored food in an optimal state by cooling the inside of the storage space using cold air generated through heat exchange with a refrigerant circulating in a refrigeration cycle.

Additionally, the refrigerator may include an air purification filter for removing harmful bacteria contained in cold air inside a refrigerating compartment or a freezing compartment. The air purification filter may contain sterilizing ingredients suitable for the type, size, or biological characteristics of an object to be removed.

Conventionally, a filter assembly has been proposed in which a plurality of filters are arranged in an overlapping state for sterilization and deodorization of the inside of a storage room and biological and chemical ingredients including various sterilizing ingredients are applied on the filters.

Additionally, a sterilizing device has been proposed which includes a light source for emitting ultraviolet light and a photocatalytic filter for exerting a sterilizing function using ultraviolet light of a specific wavelength band emitted from the light source as a catalyst.

According to Korean Patent Publication No. 10-2013-0015016 filed by the applicant of the present invention, it can be seen that a photocatalytic filter using a light emitting diode (LED) light source for emitting ultraviolet light in a wavelength band of 256 nm is adopted.

However, a sterilizing device using a conventional ultraviolet photocatalytic filter has a disadvantage in that an LED light source for emitting ultraviolet light in a wavelength band of 256 nm is expensive and the supply of parts is poor.

In addition, a conventional ultraviolet photocatalytic filter has a problem in that ultraviolet light is not spread evenly throughout a photocatalytic filter, and thus, there is a portion of a filter that does not cause a photocatalytic reaction, resulting in poor sterilization performance.

DISCLOSURE OF INVENTION

Technical Problem

An embodiment of the present invention aims to provide a refrigerator with improved interior hygiene by providing a filter device that exerts deodorizing and antibacterial functions on a channel through which air circulates within the refrigerator.

An embodiment of the present invention aims to provide a refrigerator with improved assembly workability and improved maintenance convenience by mounting a filter device on a grille plate.

An embodiment of the present invention provides a filter device on which an LED module for emitting visible light is mounted. The filter device enables filter regeneration through a photolysis reaction. An embodiment of the present invention aims to provide a refrigerator with a filter device that maintains deodorizing and antibacterial functions semi-permanently.

An embodiment of the present invention aims to provide a refrigerator that is installed inside a suction passage and can provide a uniform flow of sterilized and deodorized air without deteriorating refrigeration performance.

Technical Solution

A refrigerator according to an embodiment of the present invention is provided with a filter device including a filter member with antibacterial and deodorization functions and a light emitting diode (LED) module that emits visible light to the filter device.

A refrigerator according to an embodiment of the present invention include: a cabinet having a storage space; a grille fan assembly forming an inner surface of the storage space, and having a channel for guiding a flow of cold air generated in an evaporator, and an outlet for discharging the cold air to the storage space; and a filter device mounted on the grille fan assembly, wherein the filter device includes: a front portion exposed to a front side of the grille fan assembly; a frame part extending rearward from the front portion and located inside the channel to accommodate a filter member; and a light emitting diode (LED) module configured to emit visible light to the filter member, wherein the filter member includes a photocatalyst for removing pollutants or bacteria adsorbed on the filter member in response to the visible light emitted from the LED module.

One end of the LED module may be fixed to a fixing part extending downward from a rear surface of the frame part, and the other end of the LED module may be mounted in an opening defined in the grille fan assembly, and the LED module is arranged spaced apart from the filter member.

The grille fan assembly may include a grille plate that forms a rear surface of the storage space and has the outlet formed therein, and the channel may include a discharge channel configured to discharge cold air into the storage space and a suction channel configured to suction the cold air inside the storage space.

A mounting part recessed to accommodate the front portion may be formed on a front surface of the grille plate, and the frame part may extend from the front portion in a direction crossing a cold air flow direction of the suction channel.

A mounting hole through which the frame part passes and an opening extending from a lower end of the mounting hole so that the fixing part passes therethrough may be defined inside the mounting part, and a seating part on which the other end of the LED module is seated may be formed at a lower end of the opening.

The grille fan assembly may include a guide part that extends rearward from the mounting hole so as to contact portions of both sides of the frame part and guides a position at which the frame part is mounted.

A length of the guide part protruding from the grille fan assembly may be shorter than a length of the seating part protruding from the grille fan assembly.

The refrigerator may include a protrusion part protruding upward from a lower surface of the seating part and contacting a lower surface of the LED module.

The frame part may be formed of an elastically deformable material, and the frame part may include cutout parts formed on both sides of the frame part by vertically cutting the frame part at an upper end or a lower end.

The frame part may include a restraining part that protrudes from an upper end or a lower end in an inward direction in which the filter member is accommodated, and restrains the filter member.

The refrigerator may include a fixing rib that protrudes from a lower end of the fixing part to both sides thereof and is bent upward, so that one end portion of the LED module is mounted thereon.

The filter member may include a photocatalyst coated on a base filter, the photocatalyst including phosphate-based glass containing metal ions selected from silver (Ag), copper (Cu), manganese (Mn), and zinc (Zn), and metal oxide that reacts to visible light.

The metal oxide may be at least one selected from titanium oxide, tungsten oxide, zinc oxide, niobium oxide, and combinations thereof.

The metal oxide may be included in an amount of 0.1 wt % to 1 wt % based on 100 wt % of the entire filter member.

The phosphate-based glass may be included in an amount of 0.1 wt % to 1 wt % based on 100 wt % of the entire filter member.

The LED module may include an LED element that emits visible light with a wavelength of 400 nm to 480 nm.

Advantageous Effects

A refrigerator according to an embodiment may expect the following effects.

The refrigerator according to an embodiment of the present invention has an advantage of improving assembly workability by allowing the filter device to be mounted through the front of the grille fan assembly.

The filter device does not constitute a separate channel and may be inserted from the front of the grille fan assembly and disposed on the cold air passage. Therefore, there is an advantage of improving productivity and reducing manufacturing costs.

In the filter device of the present invention, the fixing part extending downward is formed in the filter case. One end of the LED module is mounted on the fixing part, and the other end of the LED module is mounted on the opening of the grille fan assembly. It is possible to maintain a sufficient separation distance between the filter member accommodated in the filter case and the LED module. Accordingly, there is an advantage in that visible light emitted from the LED module can be evenly emitted to the filter member.

The filter device accommodated in the filter device of the present invention includes a filter member manufactured by immersing a base filter having a deodorizing function in a coating solution including a photocatalyst. The photocatalyst may include metal oxide and phosphate-based glass containing metal ions that exhibit antibacterial properties. Therefore, there is an advantage that exhibits not only a deodorizing function but also antibacterial properties.

Additionally, the photocatalyst reacts with visible light emitted from the LED module and can decompose pollutants such as odor-causing substances and bacteria adsorbed on the filter member. In other words, the filter member can be regenerated. Therefore, the filter member can be used semi-permanently, and thus, there is an advantage in that replacement of the filter member is not necessary.

BEST MODE FOR CARRYING OUT THE INVENTION

Hereinafter, detailed embodiments of the present invention will be described in detail with reference to the accompanying drawings. However, the scope of the present invention is not limited to proposed embodiments of the present invention, and other regressive inventions or other embodiments included in the scope of the spirits of the present invention may be easily proposed through addition, change, deletion, and the like of other elements.

Prior to the description, the directions are defined. In an embodiment of the present invention, a direction toward the opened entrance of the storage space shown in FIG. 1 may be defined as forward, a direction toward the inside of the storage space with respect to the front side of the opened door may be defined as rearward, a direction toward the floor where the refrigerator is installed may be defined as downward, and a direction away from the floor may be defined as upward.

Figure 1:
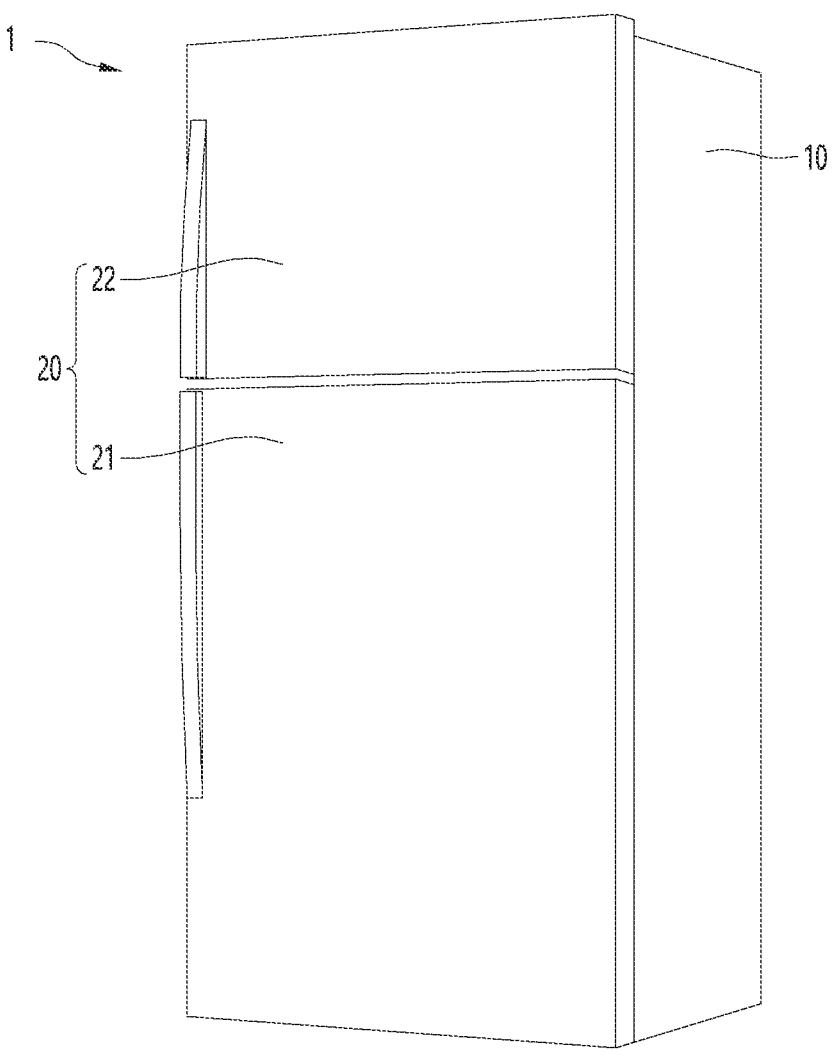
FIG. 1 is a perspective view of a refrigerator according to an embodiment of the present invention.
Figure 2:
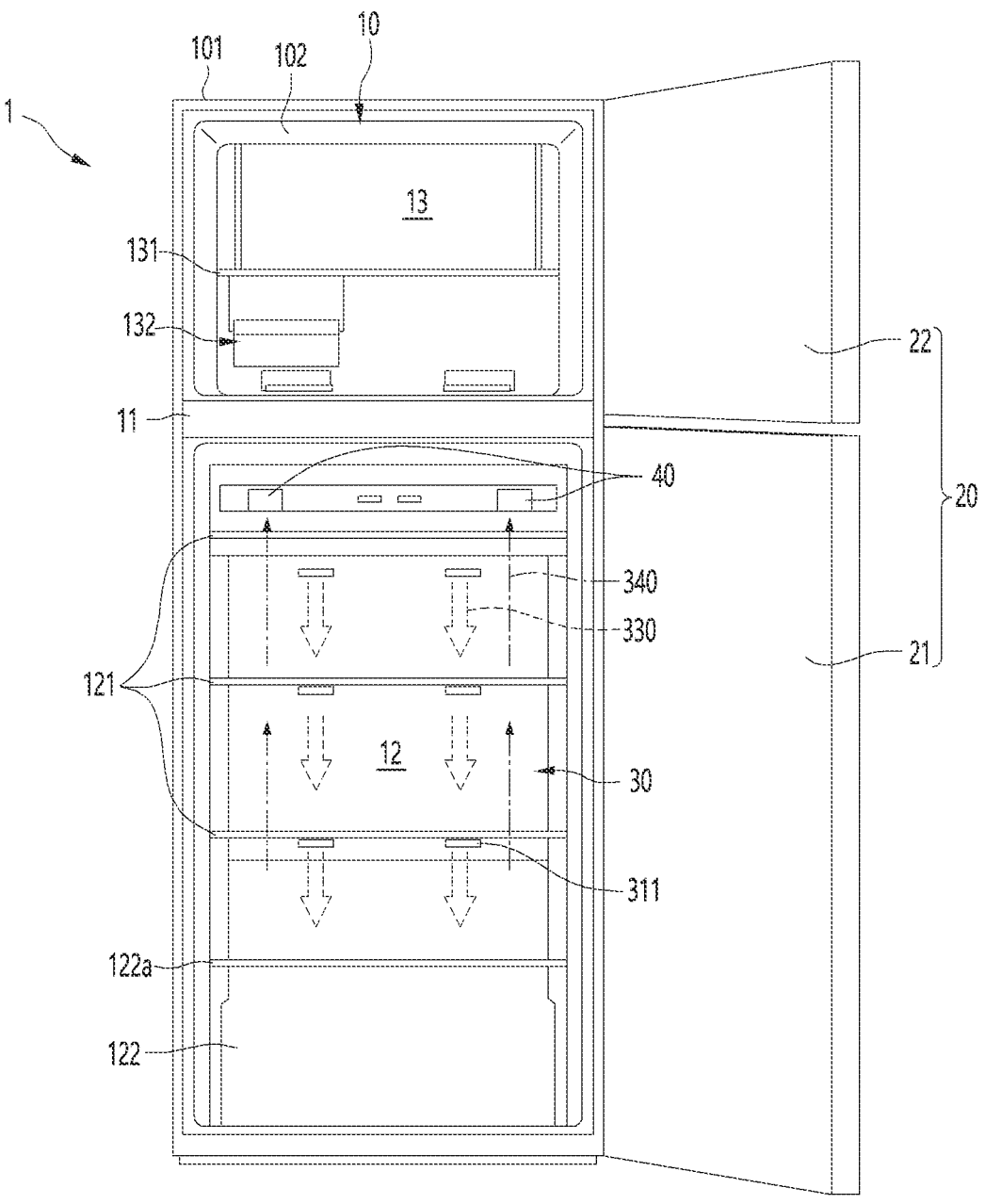
FIG. 2 is a front view showing a state in which a refrigerator door is opened, according to an embodiment of the present invention.

FIG. 1 is a perspective view of a refrigerator according to an embodiment of the present invention. FIG. 2 is a front view showing a state in which a refrigerator door is opened, according to an embodiment of the present invention.

As shown in the drawing, a refrigerator 1 according to an embodiment of the present invention may include a cabinet 10 defining a storage space, and a door 20 rotatably installed on one side of the cabinet 10 to selectively open and close the storage space.

The storage space may be vertically partitioned by a barrier 11. An upper storage space may be defined above the barrier 11, and a lower storage space may be defined below the barrier 11. The upper storage space and the lower storage space may be controlled to different temperatures so that foods having appropriate storage temperatures may be stored therein. For example, the upper storage space may be a freezing compartment 13, and the lower storage space may be a refrigerating compartment 12.

Inside the freezing compartment 13, a plurality of shelves 131 for storing food may be sequentially arranged in the vertical direction. An ice maker 132 for making ice may be further installed inside the freezing compartment 13.

Storage members such as shelves 121 and drawers 122 for storing food may be disposed inside the refrigerating compartment 12. The drawer 122 is provided in the lower portion of the refrigerating compartment 12, and a plurality of drawers 122 may be vertically stacked. The upper surface of the drawer 122 may be provided with a plate-shaped drawer cover 122*a* that shields the opened upper surface of the drawer 122.

On the other hand, the door 20 may include a refrigerating compartment door 21 rotatably mounted on the cabinet to selectively open and close the storage space of the refrigerating compartment 12. The door 20 may include a freezing compartment door 22 rotatably disposed below the refrigerating compartment door 21 to selectively open and close the storage space of the freezing compartment 13.

On the other hand, the cabinet 10 may include an outer case 101 constituting the exterior, and an inner case 102 defining at least a portion of the inner surfaces of the refrigerating compartment 12 and the freezing compartment 13 inside the outer case 101. A heat insulating material (not shown) may be provided in the space between the outer case 101 and the inner case 102.

A rear wall surface of the refrigerating compartment 12 may be formed by a grille fan assembly 30. The grille fan assembly 30 may form the rear wall surface of the refrigerating compartment 12. The grille fan assembly 30 may form a suction passage 340 and a discharge passage 330 for discharging cold air into the refrigerating compartment 12.

For example, the discharge passage 330 may be defined in the central portion of the grille fan assembly 30. For example, the suction passage 340 may be defined on both sides of the grille fan assembly 30.

A plurality of discharge holes 311 may be defined in the grille fan assembly 30. The cold air outlet 311 may communicate with the discharge passage 330 to form an outlet through which cold air guided by the discharge passage 330 is discharged into the refrigerating compartment 12.

A filter device 40 may be disposed on the suction passage 340 to cross the moving direction of cold air. Accordingly, cold air guided along the suction passage 340 may be formed to pass through the filter device 40. The cold air that has passed through the filter device 40 may be air from which odor-causing substances and bacteria present in the cold air is removed by the filter member 43.

A plurality of cold air outlets 311 may be formed at positions corresponding to the lower ends of the plurality of shelves 121. The cold air discharged from the cold air outlet 311 may evenly cool each space partitioned by the shelf 121.

The upper end or lower end of the grille fan assembly 30 communicates with an evaporation chamber where an evaporator is accommodated. Accordingly, the grille fan assembly 30 may have a structure in which cold air generated in the evaporator can be supplied to the refrigerating compartment 12.

The grille fan assembly 30 may be provided with a duct member. The duct member may form the channel at the rear side of the grille plate 31. The duct members may be formed of a material that is easy to mold and has excellent heat insulation properties. For example, the duct member may be formed of Styrofoam material.

Hereinafter, the grille fan assembly 30 is described in more detail with reference to the drawings.

Figure 3:
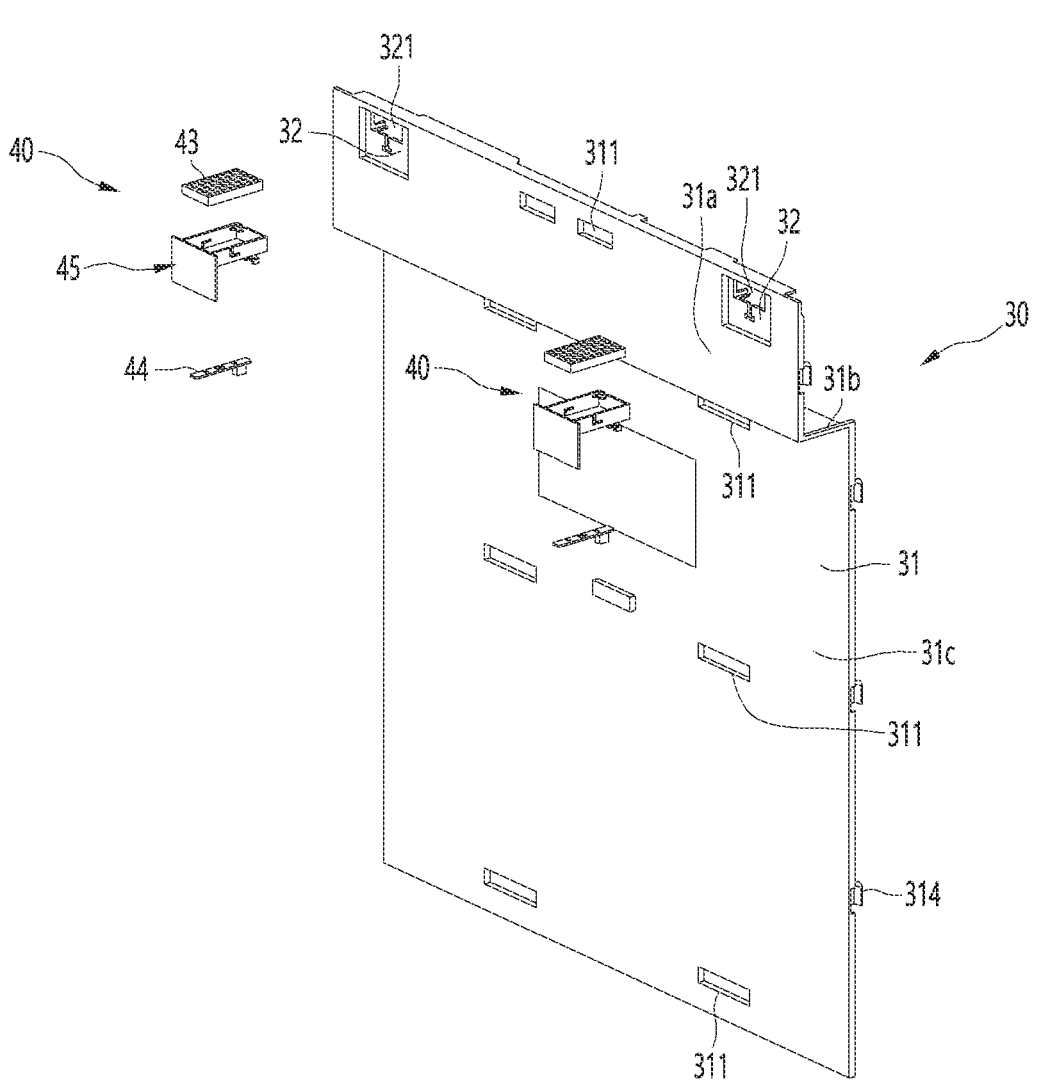
FIG. 3 is an exploded perspective view showing a filter device and a grille fan assembly when viewed from the front, according to an embodiment of the present invention.
Figure 4:
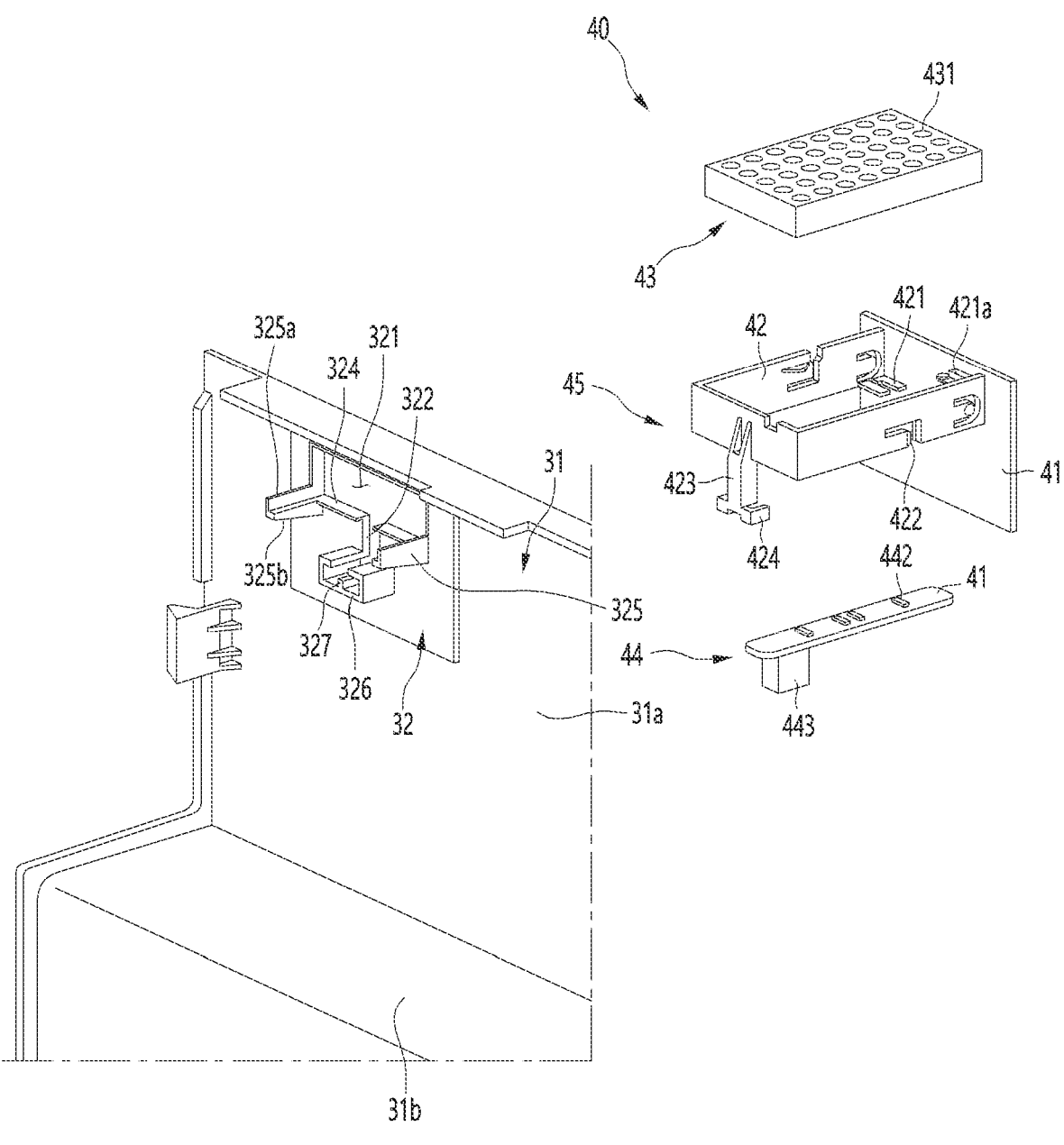
FIG. 4 is an exploded perspective view showing the filter device and the grille fan assembly viewed from the rear.

FIG. 3 is an exploded perspective view showing a filter device and a grille fan assembly when viewed from the front, according to an embodiment of the present invention. FIG. 4 is an exploded perspective view showing the filter device and the grille fan assembly viewed from the rear.

As shown in the drawing, the grille fan assembly 30 may form at least a portion of the rear wall surface of the refrigerating compartment 12. The grille fan assembly 30 may be provided in a substantially rectangular shape. However, the shape is not limited to a rectangular shape, and may be a shape that forms the rear wall surface of the refrigerating compartment 12.

The grille fan assembly 30 may include a plate-shaped grille plate 31. The grille fan assembly 30 may include a duct member provided at the rear surface of the grille plate 31 to define a channel 330.

In detail, the grille plate 31 may be formed of a plastic material and may form the rear surface of the refrigerating compartment 12. For example, the upper end portion of the grille plate 31 may be bent forward to form a stepped shape.

The grille plate 31 may include a first surface 31*a* forming the upper end portion of the grille plate 31. The grille plate 31 may include a second surface 31*b* bent backward from the first surface 31*a*. The grille plate 31 may include a third surface 31*c* extending downward from the second surface 31*b*.

The first surface 31*a* is located further forward than the third surface 31*c*, so that the grille plate 31 may be formed in an overall stepped shape.

A mounting part 32 on which the filter device 40 is mounted may be formed on the first surface 31*a*. The filter device 40 may be disposed at the rear side of the first surface 31*a* when mounted on the mounting part 32. That is, the first surface 31*a* is disposed further forward than the third surface 31*c* to define a space in which the filter device 40 is accommodated behind the grille plate 31.

On the other hand, the grille plate 31 may have a cold air separation plate formed at the rear central portion thereof, and an outlet channel 330 for discharging cold air to the refrigerating compartment and a suction channel 340 for suctioning cold air from the refrigerating compartment on both sides thereof may be formed. Additionally, the filter device 40 may be provided on the suction channel 340.

The mounting part 32 may be formed on the suction channel 340. Cold air suctioned from the refrigerating compartment passes through the filter device 40, thereby removing odors and bacteria contained in the cold air.

The circumference of the grille plate 31 may include a plurality of plate coupling parts 314 bent backward. The grille plate 31 may be fixedly mounted on the inner case 102 by the plate coupling part 314.

A plurality of outlets 311 may be formed in the grille plate 31. The outlets 311 may be formed at a positions corresponding to the positions of the shelves 121. The outlets 311 may be provided in pairs on both left and right sides at the same height from the bottom surface of the grille plate 31.

At this time, the outlets 311 may be located in the inner area of the channel 330. The outlet 311 may be located below the filter device 40 or may be located at a height corresponding to the filter device 40.

In detail, one or more outlets 311 may be formed at the central portion of the first surface 31*a*. Additionally, a plurality of outlets 311 may be spaced apart from each other in the vertical direction on the third surface 31*c*.

A mounting part 32 on which the filter device 40 is mounted may be formed at the upper end portion of the grille plate 31.

A plurality of filter devices 40 may be mounted on the grille plate 31. A plurality of mounting parts 32 may be formed at positions corresponding to the filter device 40.

For example, a pair of filter devices 40 may be disposed on both left and right sides of the grille plate 31, and a plurality of mounting parts 32 may be formed at positions corresponding to the filter device 40.

The front surface of the mounting part 32 may be formed by recessing the grille plate 31 in a shape corresponding to the shape of the front surface of the filter device 40. A mounting hole 321 may be formed at the center of the mounting part 32 to pass through the grille plate 31 in the front-and-back direction. The mounting hole 321 may be opened to allow a portion of the filter device 40 to pass therethrough.

In detail, the filter device 40 may include a front portion 41 that forms the front surface. The filter device 40 may include a frame part 42 extending rearward from the front portion 41 and defining a space in which the filter member 43 is accommodated.

The filter device 40 may include an LED module 44 disposed below the frame part 42.

On the other hand, the frame part 42 may substantially protrude and extend rearward from the upper end portion of the front portion 41. The LED module 44 may be fixed by a fixing part 423 extending downward from the frame part 42.

At this time, the size of the front portion 41 of the filter device 40 may correspond to the size of the mounting part 32. The mounting hole 321 may have a cross-sectional size corresponding to that of the frame part 42.

The frame part 42 of the filter device 40 may pass through the mounting hole 321 from the rear side thereof, and the filter device 40 may be inserted into the rear of the grille plate 31.

The front portion 41 of the filter device 40 may be mounted on the grille plate 31 in contact with the front surface of the mounting part 32.

A protrusion part 323 that restricts the flow of the filter device 40 while the filter device 40 is mounted may be further formed in the mounting part 32. The protrusion part 323 may protrude outward from the upper end or lower end of the mounting hole 321.

The protrusion part 323 may contact the upper or lower surface of the filter device 40 while the filter device 40 is completely mounted on the grille plate 31. That is, the protrusion part 323 allows the filter device 40 to be mounted more firmly.

The mounting part 32 may further include a support part 324 extending rearward along the lower end of the mounting hole 321. The support part 324 supports the filter device 40 from below while the filter device 40 is mounted on the grille plate 31. The support part 324 may be connected to the guide part 325.

The mounting hole 321 may be formed so that the fixing part 423 on which the LED module 44 is mounted may pass therethrough. For example, the mounting hole 321 may further have an opening 322 formed at a position corresponding to the fixing part 423. The opening 322 may extend downward from the lower end of the mounting hole 321. The opening 322 may be formed in a shape corresponding to the fixing part 423.

On the other hand, a guide part 325 that guides the position at which the filter device 40 is mounted and also supports the filter device 40 from both sides may be formed on the rear surface of the mounting portion 32.

The guide part 325 may be formed to extend rearward from the mounting hole 321. When an operator assembles the filter device 40 by pushing the filter device 40 from the front to the rear of the mounting part 32, the guide part 325 may guide the position at which the filter device 40 is mounted, so that the filter device 40 can be positioned correctly on the suction channel 340.

The guide part 325 may be formed to extend rearward from the lower edge of the mounting hole 321. The guide part 325 may include a vertical part 325a coming into contact with both sides of the filter device 40.

The guide part 325 may be formed by connecting the vertical part 325a to the horizontal part 325b coming into contact with the lower surface of the filter device 40.

The guide part 325 may be formed to be shorter than the length of the seating part 326 protruding rearward from the mounting part 32, which will be described below. That is, the length of the guide part 325 protruding from the mounting part 32 may be shorter than the length of the seating part 326 protruding from the mounting part 32. This is to prevent the guide part 325 from interfering in the process of assembling the LED module 44 to the frame part 42.

The guide part 325 may be located further forward than the cutout part 422 formed in the frame part 42 while the filter device 40 is mounted on the mounting part 32. That is, the guide part 325 may extend from the mounting part 32 to the front of the cutout part 422. It is possible to prevent the guide part 325 from interfering with the cutout part 422 during the process of attaching or detaching the filter member 43.

A seating part 326 on which one end of the LED module 44 is seated is formed on the rear surface of the mounting part 32. The seating part 326 may be formed to extend rearward from the opening 322. The LED module 44 of the present invention is spaced apart from the filter member 43 at a set interval so as to secure a large irradiation area. In order to allow the LED module 44 to be mounted on the frame part 42, one end of the LED module 44 may be supported by the seating part 326, and the other end of the LED module 44 may be supported by the fixing part 423 formed on the frame part 42.

The seating part 326 may be formed to extend rearward along the circumference of the lower end portion of the opening 322.

The seating part 326 includes a lower surface 326a extending rearward from the lower end of the opening 322.

The seating part 326 may include side surfaces 326b extending upward from the lower surface 326a.

The seating part 326 may be formed to include an upper surface 326c bent inward from the upper end of the side surfaces 326b.

The upper surface 326c of the seating part 326 may be formed by cutting a portion of the LED module 44, so that the LED module 44 can be seated inside the seating portion 326, while the frame part 42 passes through the mounting hole 321 and is mounted on the mounting part 32.

A protrusion part 327 protruding upward and guiding the position at which the LED module 44 is mounted may be further formed on the lower surface 326a of the seating part 326.

The protrusion part 327 is elongated along the center of the lower surface of the seating part 326, so that the LED module 44 can be mounted at a correct position.

The protrusion part 327 is formed to contact the lower surface of the LED module 44, thereby preventing the LED module 44 from being separated from the seating part 326.

Hereinafter, the structure of the filter device 40 and the combined structure of the filter device 40 are described in more detail with reference to the drawings.

Figure 5:
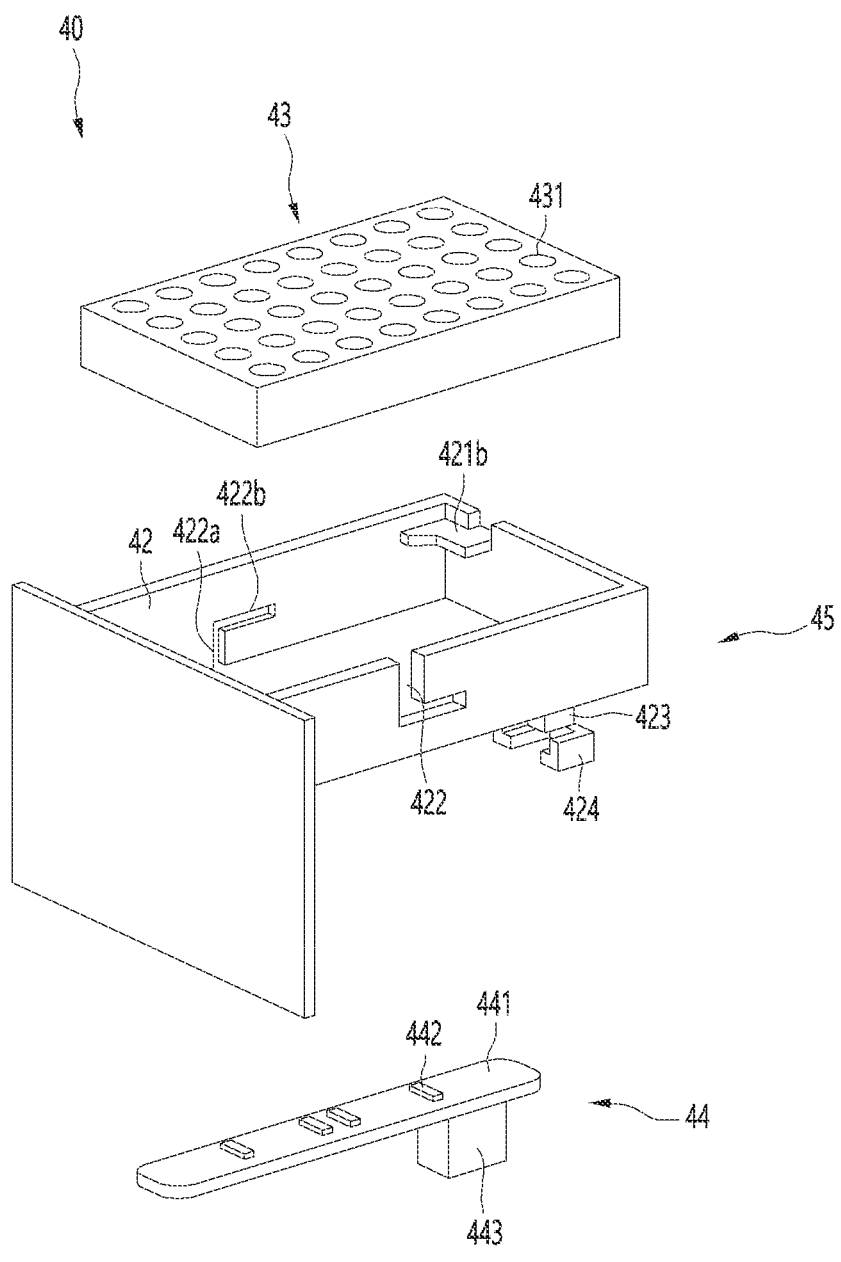
FIG. 5 is an exploded perspective view of the filter device.
Figure 6:
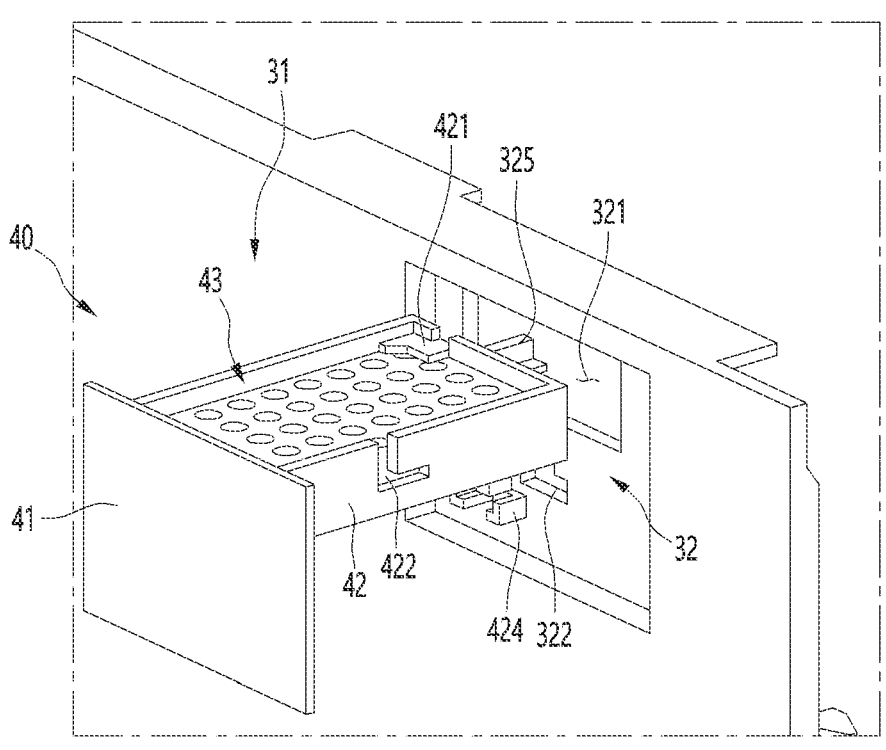
FIG. 6 is a perspective view showing the combined structure of the filter device and the grille fan assembly.
Figure 7:
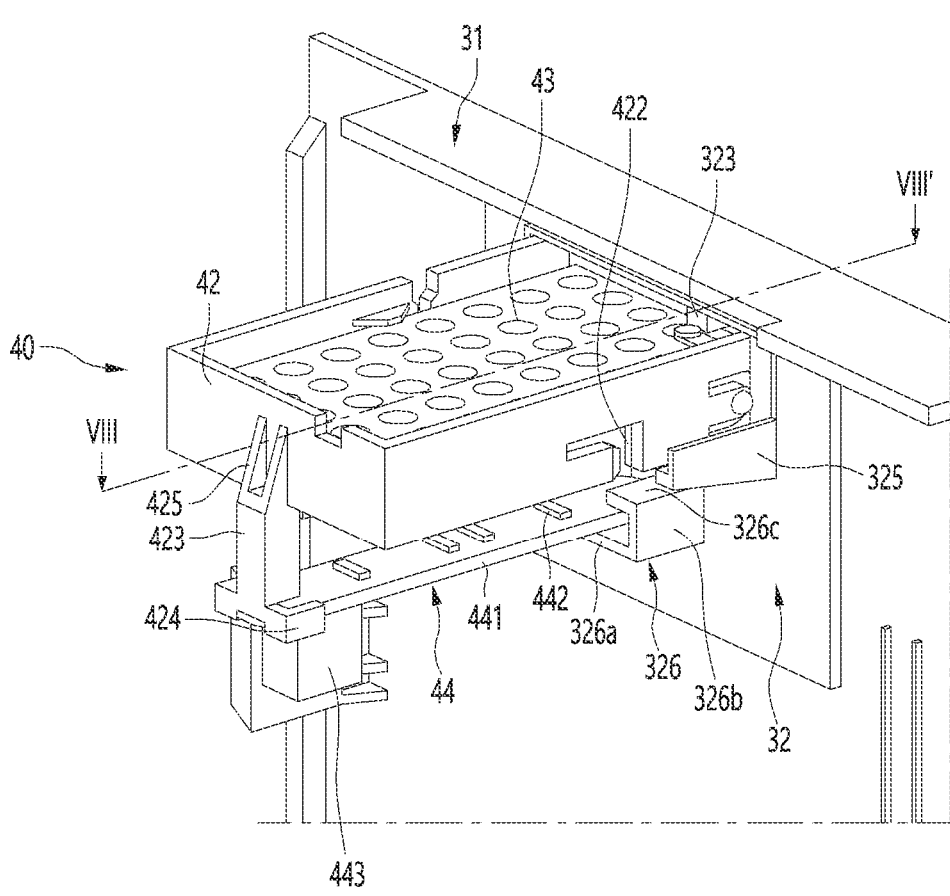
FIG. 7 is a perspective view showing a state in which an LED module is mounted when the filter device is fitted to the grille fan assembly.
Figure 8:
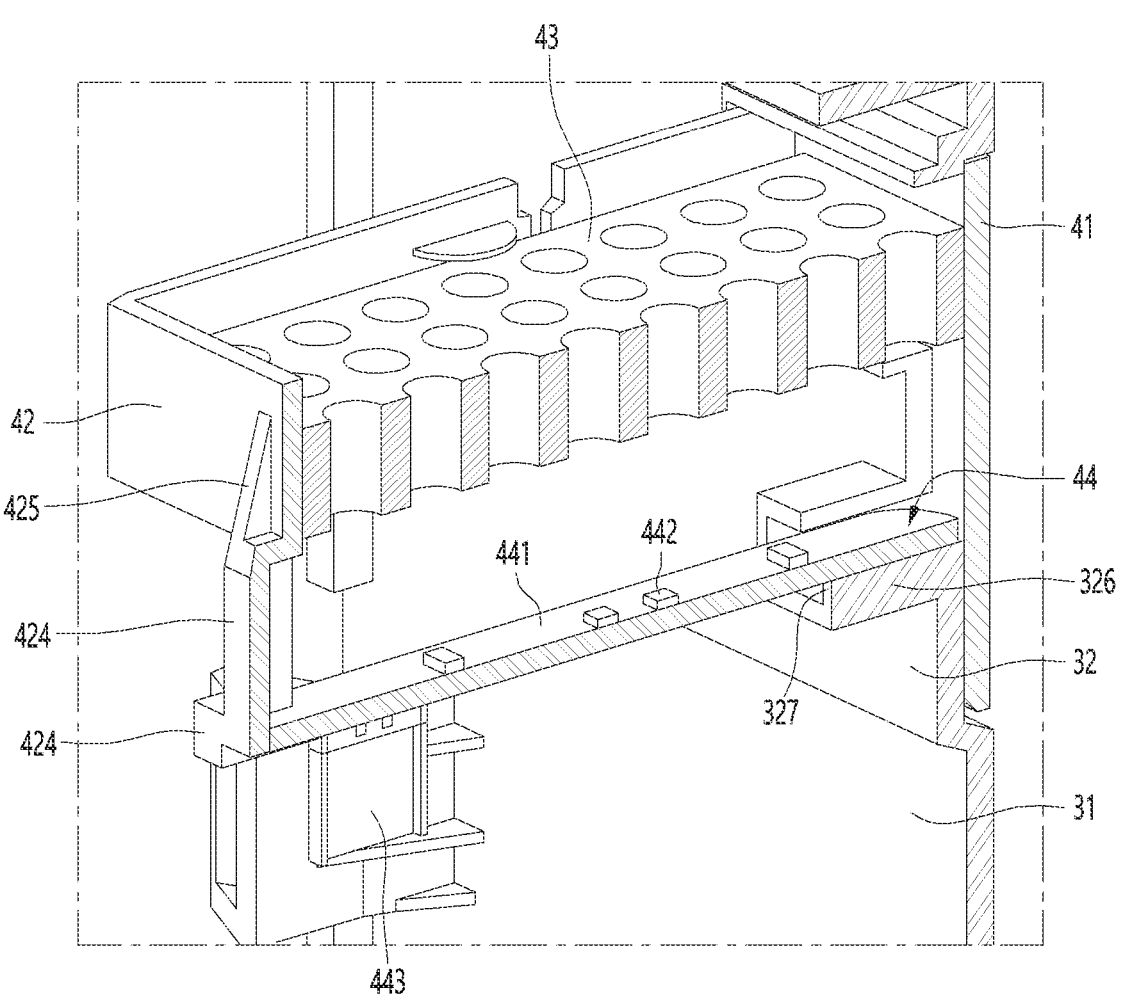
FIG. 8 is a cross-sectional view taken along line VIII-VIII' of FIG. 7.

FIG. 5 is an exploded perspective view of the filter device. FIG. 6 is a perspective view showing the combined structure of the filter device and the grille fan assembly. FIG. 7 is a perspective view showing a state in which the LED module is mounted when the filter device is fitted to the grille fan assembly. FIG. 8 is a cross-sectional view taken along line VIII-VIII' of FIG. 7.

As shown in the drawing, the filter device 40 may include a front portion 41, a frame part 42, a filter member 43 inserted into the frame part 42, a filter member 43, and an LED module 44 that emits visible light to the filter member 43.

The front portion 41 and the frame part 42 may be formed integrally. Additionally, the front portion 41 and the frame part 42 are not limited, but may be formed of a plastic material.

A state in which the front portion 41 and the frame part 42 are formed may also be referred to as a filter case 45.

The front portion 41 may be formed in a rectangular plate shape. The front portion 41 may be accommodated in a space recessed from the front surface of the mounting part 32.

The frame portion 42 may pass through the mounting hole 321 and extend to the rear of the grille plate 31.

The frame part 42 may extend rearward from the upper end portion of the front portion 41. The frame part 42 may be formed in a rectangular shape with open upper and lower surfaces. The inner space of the frame part 42 may be formed to accommodate the filter member 43.

The filter member 43 may be formed in a corresponding shape so as to be accommodated inside the frame part 42. The present invention is not limited thereto. For example, the filter member 43 may be formed in a hexahedral shape.

The filter member 43 can immerse the base filter in the coating solution including the photocatalyst. Alternatively, the filter member 43 may be manufactured by spraying the coating solution on the base filter.

The base filter may be formed of a material with excellent deodorizing performance. For example, the base filter is not limited thereto, but may be formed of a material with excellent adsorption properties, such as activated carbon, zeolite, or vermiculite, or may be formed of a composite material.

Alternatively, the base filter may be configured in a foam or mesh form.

The photocatalyst is a material that has deodorization and antibacterial effects by generating superoxide anions or hydroxy radicals through electrons and holes generated from energy obtained by absorbance of light.

Additionally, the photocatalyst may have an absorption rate for visible light.

For example, the photocatalyst may include metal oxide and phosphate-based glass containing metal ions. In detail, the photocatalyst may include a porous metal oxide film and metal particles formed on the surface of the porous metal oxide film.

The metal oxide may include at least one metal oxide selected from titanium oxide, tungsten oxide, zinc oxide, niobium oxide, and combinations thereof. Considering antibacterial performance and activation by visible light, it is preferable to use tungsten oxide ($WO_3$). When the metal oxide receives light energy in the visible light range, the metal oxide has antibacterial and deodorization effects through oxidation-reduction reaction.

The metal ions may be metal ions having antibacterial properties, such as silver (Ag), copper (Cu), manganese (Mn), or zinc (Zn), which exhibits antibacterial properties. Considering antibacterial performance and risk to the human body, it is most desirable to use silver (Ag).

As a specific example, the phosphate-based glass may be silver phosphate glass. In the phosphate-based glass, metal ions gradually dissolve due to contact with moisture in the cold air passing through the filter device 40, thereby obtaining an antibacterial effect.

The metal oxide may be included in an amount of 0.1 wt % to 1 wt %, preferably 0.1 wt % to 0.5 wt %, based on 100 wt % of the entire filter member 43.

The phosphate-based glass may be included in an amount of 0.1 wt % to 1 wt %, preferably 0.3 wt % to 0.7 wt %, based on 100 wt % of the entire filter member 43.

When the metal oxide and the phosphate-based glass are included in the filter member 43 in excess of the above range, the photocatalyst may aggregate inside the filter member, resulting in poor appearance.

When the metal oxide and the phosphate-based glass are included in the filter member 43 in amounts less than the above range, the antibacterial performance of the filter member 43 may be reduced.

The method of manufacturing the filter member 43 is not limited. For example, the filter member 43 may be manufactured by the following method.

After a coating solution is prepared by stirring the silver phosphate-based glass and tungsten oxide, the filter base is immersed in the prepared coating solution while stirring the prepared coating solution. At this time, a surfactant may be added to the coating solution. The filter member may be manufactured by drying the filter base coated with the photocatalyst.

On the other hand, the filter member 43 may be formed with a plurality of through holes 431 that penetrate in the vertical direction.

The through holes 431 allow air passing through the suction channel 340 to pass in an upward/downward direction, that is, in a direction perpendicular to the extending direction of the frame part 42. In the process in which air passes through the through holes 431, odor-generating particles in the air may be adsorbed on the filter member 43.

In the process of passing through the through holes 431, bacteria in the air may be removed.

The contact area between the filter member 43 and air may be increased by the plurality of through holes 431, thereby improving deodorization and antibacterial performance.

The air flowing along the suction channel 340 passes through the filter member 43 via the plurality of through holes 431. Therefore, it is possible to prevent air flow loss while passing through the filter member 43.

On the other hand, a restraining part 421 that restrains the filter member 43 may be formed at the upper end of the frame part 42. A plurality of restraining parts 421 may be formed at corners of the frame part 42. The restraint part 421 may be formed to protrude from the corner of the frame part 42 in an inward direction in which the filter member 43 is accommodated.

In detail, first restraining parts 421*a* connected to the front portion 41 may be formed on both left and right sides of the frame part 42.

Second restraining parts 421*b* connected to the rear surface of the frame part 42 may be formed on both left and right sides of the frame part 42.

The restraining part 421 may be located above the filter member 43 when the filter member 43 is mounted on the frame part 42. Alternatively, the restraining part 421 may be formed at a position in contact with the upper surface of the filter member 43.

The restraining part 421 may prevent the filter member 43 from being separated and released from the frame part 42.

Cutout portions 422 may be further formed on both left and right sides of the frame part 42. The cutout portions 422 may be formed by cutting the frame part 42 in the vertical direction at the upper end or lower end thereof.

The cutout portions 422 allow the frame part 42 to be elastically deformed more easily, so that the filter member 43 may be easily mounted on the frame part 42.

In detail, the cutout portion 422 may include a cutout vertical part 422*a* extending from the upper end or lower end of the frame part 42 in the vertical direction.

The cutout portion 422 may further include a cutout horizontal part 422*b* extending from the cutout vertical portion 422*a* in the front-and-back direction of the frame part 42.

On the other hand, an LED module 44 may be mounted below the frame part 42. The LED module 44 may be configured to emit visible light toward the filter member 43. The LED module 44 may regenerate the filter member 43 through a photolysis reaction by emitting visible light to the filter member 43.

The LED module 44 may be spaced apart from the filter member 43 at a set interval. Accordingly, it is possible to secure a wide area where visible light is emitted to the filter member 43.

The LED module 44 may be mounted on the fixing part 423 extending downward at the rear end of the frame part 42. The LED module 44 may be disposed downward and spaced apart from the filter member 43 by the fixing part 423.

The fixing part 423 may be formed to extend further downward than the lower end of the frame part 42. The fixing part 423 is formed in a rectangular frame shape with an open front side, so that one end of the LED module 44 can be inserted into the open front side.

A fixing rib 424 for fixing and supporting one end of the LED module 44 may be formed at the lower end of the fixing part 423. The fixing rib 424 may be formed by protruding and bending from the lower end of the fixing part 423.

One end portion of a substrate part 441 is supported by the fixing rib 424 to prevent the LED module 44 from being separated from the filter device 40. The fixing rib 424 may be formed of an elastically deformable material.

In detail, the fixing rib 424 may extend from the lower end of the fixing part 423 to both sides to support both sides of the LED module 44. The length of the left and right sides of the fixing rib 424 may be formed to correspond to the left and right width of the LED module 44.

A reinforcing part 425 protruding backward and connected to the fixing part 423 may be further formed on the rear surface of the frame part 42. The reinforcing part 425 may extend from the rear surface of the frame part 42 in the vertical direction and may be connected to the upper end of the fixing part 423. The reinforcing part 425 may further strengthen the frame part 42.

The reinforcing part 425 may prevent the fixing part 423 from being deformed by twisting or bending during the process of mounting the LED module 44.

The LED module 44 may include a substrate part 441 and a plurality of LED elements 442 mounted on the substrate part 441.

The LED module 44 may further include a control box 443 mounted on the lower edge of the substrate part 441.

The substrate part 441 may correspond to the length of the filter member 43 in the front-and-back direction or may be formed to be slightly longer. In this case, visible light may be emitted evenly to the filter member 43.

A plurality of the LED elements 442 may be mounted along the lower surface of the substrate part 441.

The LED element 442 may be an LED element that emits visible light with a wavelength between 400 nm and 500 nm. Preferably, the LED element 442 may be an LED element that emits visible light with a wavelength between 400 nm and 480 nm.

Visible light emitted from the LED element 442 is emitted to the filter member 43, and the photocatalyst contained in the filter member 43 may be activated by receiving the light. The activated photocatalyst may decompose microorganisms or volatile organic compounds harmful to the human body, such as bacteria and viruses in the air.

In addition, the LED element 422 is not limited thereto. Preferably, for example, the LED element 422 is a chip-on-board type LED light emitting element that emits visible light in a Lambertian manner.

As described above, the LED module 44 may activate the photocatalyst contained in the filter member 43 by emitting visible light to the filter member 43.

In this case, pollutants contained in the filter member 43 may be decomposed. That is, odor-causing substances adsorbed on the filter member 43 may be removed. Therefore, there is an advantage in that the filter member 43 may be regenerated and used semi-permanently.

In detail, the filter member 43 is mounted on the frame part 42 in a state in which the lower surface thereof is opened. One end of the LED module 44 may be mounted on the fixing part 423 formed in the frame part 42, and the other end of the LED module 44 may be mounted on the seating part 326 formed in the mounting part 32. The LED module 44 may emit visible light to the filter member 43 at a position spaced downward from the filter member 43.

Hereinafter, the process of assembling the filter device 40 to the grille plate 31 is described in detail with reference to FIGS. 5 and 6.

First, as shown in FIG. 6, the operator mounts the filter member 43 on the frame part 42. The rear of the frame part 42 is inserted through the front of the mounting hole 321. At this time, the guide part 325 may guide the inserting direction so that the frame part 42 is mounted at the correct position.

At this time, the LED module 44 is in a state of not being mounted on the fixing part 423. That is, when the LED module 44 is not assembled to the frame part 42, the frame part 42 passes through the mounting hole 321 and is mounted on the mounting part 32.

When the frame part 42 is completely fitted to the rear of the mounting hole 321, the front portion 41 may be located in complete contact with the mounting part 32. Additionally, the frame part 42 may be located behind the grille plate 31.

As shown in FIG. 7, when the front portion 41 and the frame part 42 are completely mounted on the grille plate 31, the operator may assemble the LED module 44 to the filter device 40.

The operator inserts one end portion of the LED module 44 into the fixing rib 424 and then pushes the LED module 44 toward the front of the opening 322. Accordingly, the other end portion of the substrate part 441 may be seated and fixed on the seating part 326.

The LED module 44 is mounted on the grille plate 31 integrally with the filter device 40, and thus, assembly work may be relatively facilitated.

The LED module 44 is separately mounted behind the grille plate 31 while the frame part 42 is fixed to the mounting part 32. Accordingly, there is an advantage in that the task of arranging electric wires connected to the LED module 44 is also easy.

On the other hand, the air flow occurring in the filter device 40 is described. Cold air suctioned from the storage space travels in a direction crossing a direction in which the filter device 40 is introduced into the grille plate 31, and then flows into the filter device 40.

Cold air flowing into the filter device 40 is sterilized and deodorized while passing through the filter member 43 coated with the visible light catalyst.

Cold air that has passed through the filter device 40 may be supplied to the evaporation chamber and may be then discharged back to the storage space.

In addition, the pollutants adsorbed on the filter member 43 are decomposed into substances harmful to the human body when the visible photocatalyst reacts with visible light emitted from the LED module, and the filter member 43 may be regenerated.

INDUSTRIAL APPLICABILITY

A refrigerator according to an embodiment of the present invention includes a filter device on a channel through which cold air flows, thereby improving a deodorizing function and antibacterial properties. Therefore, the present invention is industrially applicable.

The invention claimed is:

1. A refrigerator comprising:
a cabinet having a storage space;
a grille fan assembly that defines an inner surface of the storage space, the grille fan assembly having (i) a channel configured to guide a flow of cold air generated in an evaporator, and (ii) an outlet configured to discharge the cold air to the storage space; and
a filter device mounted on the grille fan assembly,
wherein the filter device comprises:
a front portion exposed to a front side of the grille fan assembly,
a frame part that extends rearward from the front portion and is located inside the channel, the frame part being configured to accommodate a filter member, and
a light emitting diode (LED) module configured to emit visible light to the filter member,
wherein the filter member comprises a photocatalyst configured to remove pollutants or bacteria adsorbed on the filter member in response to the visible light emitted from the LED module,
wherein the grille fan assembly comprises a grille plate that defines a rear surface of the storage space, the grille plate defining the outlet therein, and
wherein the grille plate further defines a mounting part recessed from a front surface of the grille plate and configured to accommodate the front portion of the filter device.

2. The refrigerator of claim 1, wherein the frame part includes a fixing part extending downward from a rear surface of the frame part, and
wherein the LED module has:
a first end fixed to the fixing part of the frame part; and
a second end mounted in an opening that is defined in the grille fan assembly, the LED module being spaced apart from the filter member.

3. The refrigerator of claim 1,
wherein the channel comprises:

a discharge channel configured to discharge cold air into the storage space; and
a suction channel configured to suction the cold air from the storage space.

4. The refrigerator of claim 3,
wherein the frame part extends from the front portion in a direction crossing a cold air flow direction of the suction channel.

5. The refrigerator of claim 4, wherein the frame part includes a fixing part extending downward from a rear surface of the frame part, and
wherein the mounting part includes:
a mounting hole that receives the frame part,
an opening that extends from a lower end of the mounting hole and receives the fixing part of the frame part, and
a seating part that supports an end of the LED module and that is disposed at a lower end of the opening.

6. The refrigerator of claim 5, wherein the grille fan assembly comprises a guide part that extends rearward from the mounting hole and is configured to contact portions of both sides of the frame part to thereby guide a position at which the frame part is mounted.

7. The refrigerator of claim 6, wherein a length of the guide part protruding from the grille fan assembly is shorter than a length of the seating part protruding from the grille fan assembly.

8. The refrigerator of claim 5, further comprising a protrusion part protruding upward from a lower surface of the seating part and contacting a lower surface of the LED module.

9. The refrigerator of claim 1, wherein the frame part is made of an elastically deformable material, and
wherein the frame part comprises cutout parts provided at both sides of the frame part by vertically cutting the frame part at an upper end or a lower end.

10. The refrigerator of claim 1, wherein the frame part comprises a restraining part that protrudes from an upper end of the frame part or a lower end of the frame part in an inward direction in which the filter member is accommodated, the restraining part being configured to restrict movement of the filter member.

11. The refrigerator of claim 2, further comprising a fixing rib that protrudes from a lower end of the fixing part to both sides thereof and is bent upward, so that one end portion of the LED module is mounted thereon.

12. The refrigerator of claim 1, wherein the filter member comprises a photocatalyst coated on a base filter, the photocatalyst including phosphate-based glass containing metal ions selected from silver (Ag), copper (Cu), manganese (Mn), and zinc (Zn), and metal oxide that reacts to visible light.

13. The refrigerator of claim 12, wherein the metal oxide is at least one selected from titanium oxide, tungsten oxide, zinc oxide, niobium oxide, and combinations thereof.

14. The refrigerator of claim 12, wherein the metal oxide is included in an amount of 0.1 wt % to 1 wt % based on 100 wt % of the entire filter member.

15. The refrigerator of claim 12, wherein the phosphate-based glass is included in an amount of 0.1 wt % to 1 wt % based on 100 wt % of the entire filter member.

16. The refrigerator of claim 12, wherein the LED module comprises an LED element that emits visible light with a wavelength of 400 nm to 480 nm.

* * * * *